UNITED STATES PATENT OFFICE 2,409,859

2-ETHYLHEXYL FLUOROACETATE

John L. Horsfall, New York, N. Y., assignor to American Cyanamid Company, New York, N. Y., a corporation of Maine No Drawing. Application December 29, 1944, Serial No. 570,457

1 Claim. (Cl. 260—487)

The present invention relates to 2-ethylhexyl fluoroacetate, a new compound.

While the literature makes certain general statements with regard to the esters of all halogen substituted organic acids such, for instance, as Patent 2,338,791 to Weedon, yet it is perfectly apparent from this reference and from others in a similar category that no esters of fluoroacetic acid were specifically contemplated or they would have been pointed out particularly. Tests have indicated that the fluoroacetic acid compounds have outstanding toxicity and are far superior in this respect to the corresponding compounds of the other halogens. This is most surprising as it has generally been assumed that the order of toxicity of halogen compounds is in the increasing order of fluorine, chlorine, bromine and iodine. It was, therefore, a rather startling discovery when it was found, for instance, that as little as .04 gram of this compound in ethyl alcohol placed on the shaved ear of a 4000 gram rabbit, killed the animal in from 6 to 10 hours. This conclusively demonstrates the extreme and most unexpected toxicity of this compound through contact.

It has also been demonstrated that a 100% kill of aphids may be obtained by spraying them with a 1–10,000 dilution of this material in a solvent medium consisting of 65% acetone and 35% water.

This compound is also useful as an intermediate, and may be used for other purposes.

The following example illustrates a specific method of preparing the above compound in accordance with the invention.

Example

A mixture consisting of 387 grams of ethyl fluoroacetate, 457 grams of 2-ethylhexanol and 5 grams of p-toluenesulfonicacid monohydrate was heated gradually during a period of about three hours in a 2-liter flask equipped with stirer, thermometer, and a Vigreux column surmounted by a reflux still-head. When the batch temperature reached about 100° C. ethanol began to distill off and continued to distill until a temperature of 160° C. was attained. The crude reaction mixture was cooled to room temperature, washed with 85 cc. of 10% sodium bicarbonate solution, dried over anhydrous calcium sulfate overnight, and then distilled under vacuum. 498.1 grams (75% yield) of 2-ethylhexyl fluoroacetate were obtained. The product is a water-white, limpid liquid having a boiling point of 65–68° C. at 2 mm. pressure and a refractive index of 1.4173 at 25° C.

While the invention has been described with particular reference to specific embodiments, it is to be understood that it is not to be limited thereto but is to be construed broadly and restricted solely by the scope of the appended claim.

I claim:

2-ethylhexyl fluoroacetate.

JOHN L. HORSFALL.